(12) United States Patent  (10) Patent No.: US 6,326,447 B1
Fitzgerald  (45) Date of Patent: Dec. 4, 2001

(54) POLYMERIC COMPOSITIONS FOR SOIL RELEASE ON FABRICS

(75) Inventor: John J Fitzgerald, Boothwyn, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/312,264

(22) Filed: May 14, 1999

Related U.S. Application Data

(60) Provisional application No. 60/089,871, filed on Jun. 19, 1998.

(51) Int. Cl.$^7$ ............................. C08F 18/20; C08F 20/24
(52) U.S. Cl. ......................... 526/245; 526/273; 526/310; 526/319; 526/329.4
(58) Field of Search .................. 526/245, 329.4, 526/310, 273

(56) References Cited

U.S. PATENT DOCUMENTS

| | | | |
|---|---|---|---|
| 3,282,905 | 11/1966 | Fasick et al. . | |
| 3,378,609 | 4/1968 | Fasick et al. . | |
| 4,013,627 | 3/1977 | Temple | 526/245 |
| 4,127,711 | 11/1978 | Lori et al. . | |
| 4,147,851 | 4/1979 | Raynolds | 526/245 |
| 4,366,299 | 12/1982 | Dessaint | 526/243 |
| 4,478,975 | 10/1984 | Dessaint et al. | 524/871 |
| 4,499,146 | 2/1985 | Piacenti et al. | 428/422 |
| 4,525,423 | 6/1985 | Lynn et al. | 428/421 |
| 4,579,924 | 4/1986 | Schwartz et al. | 526/243 |
| 4,595,428 | 6/1986 | Anthony et al. | 148/187 |
| 4,716,208 | 12/1987 | Korzeniowski | 526/245 |
| 4,931,505 | 6/1990 | Miyazaki et al. | 525/125 |
| 5,011,713 | 4/1991 | Lenti et al. | 427/393.6 |
| 5,247,008 | 9/1993 | Michels et al. | 524/544 |
| 5,439,998 | 8/1995 | Lina et al. | 526/243 |
| 5,674,934 | 10/1997 | Schmidt et al. | 524/555 |
| 5,674,961 | 10/1997 | Fitzgerald | 526/273 |
| 5,872,180 | 2/1999 | Michels et al. | 524/544 |

FOREIGN PATENT DOCUMENTS

| | | |
|---|---|---|
| 4426536-A | 1/1996 | (DE) . |
| 4426537-A | 1/1996 | (DE) . |
| 0 554 667 A1 | 8/1993 | (EP) . |
| 612770 | 8/1994 | (EP) . |
| 0 682 146 A | 11/1995 | (EP) . |
| 2639353 | 5/1990 | (FR) . |
| WO 97/39072 A | 10/1997 | (WO) . |

*Primary Examiner*—Fred Zitomer

(57) ABSTRACT

A copolymer composition and its use as a soil release agent for fabrics comprising monomers copolymerized in the following percentages by weight (a) from about 30% to about 49% of at least one monomer of formula I:

$$R_f\text{—}Q\text{—}A\text{—}C(O)\text{—}C(R)\text{=}CH_2 \qquad \text{I}$$

wherein $R_f$ is a straight or branched-chain perfluoroalkyl group of from 2 to about 20 carbon atoms, R is H or $CH_3$, A is O, S or N(R'), wherein R' is H or an alkyl of from 1 to about 4 carbon atoms, Q is alkylene of 1 to about 15 carbon atoms, hydroxy-alkylene of 3 to about 15 carbon atoms, —$(C_nH_{2n})$ $(OC_qH_{2q})_m$—, —$SO_2$—$NR'(C_nH_{2n})$—, or —$CONR'(C_nH_{2n})$, wherein R' is H or an alkyl of from 1 to about 4 carbon atoms, n is 1 to about 15, q is 2 to about 4, and m is 1 to about 15;

(b) from about 10% to about 70% of at least one monomer or a mixture of monomers selected from formula IIA, formula IIB, and formula IIC:

$$(R_1)_2N\text{—}(CH_2)_r\text{—}Z\text{—}C(O)\text{—}C(R_2)\text{=}CH_2 \qquad \text{IIA}$$

$$(O)(R_3)(R_4)N\text{—}(CH_2)_r\text{—}Z\text{—}C(O)\text{—}C(R_2)\text{=}CH_2 \qquad \text{IIB}$$

$$X^-(R_5)(R_4)(R_3)N^+\text{—}(CH_2)_r\text{—}Z\text{—}C(O)\text{—}C(R_2)\text{=}CH_2 \qquad \text{IIC}$$

wherein

Z is —O— or —$NR_5$—; $R_1$ is an alkyl group of from 1 to about 3 carbon atoms; $R_2$ is H or an alkyl radical of 1 to about 4 carbon atoms; $R_3$ and $R_4$ are each an alkyl of 1 to 4 carbon atoms, hydroxyethyl, benzyl, or $R_3$ and $R_4$ together with the nitrogen atom form a morpholine, pyrrolidine, or piperadine ring; $R_5$ is H or an alkyl of 1 to 4 carbon atoms, or $R_3$, $R_4$ and $R_5$ together with the nitrogen atom form a pyridine ring; r is 2 to 4; and wherein for formula IIA the nitrogen is from about 40% to 100% salinized; and, (c) from 0% to about 7% of a monomer of the formula III, IV, V or VI or a mixture thereof:

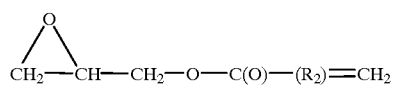

III $$Cl\text{—}CH_2\text{—}CH(OH)CH_2\text{—}O\text{—}C(O)\text{—}C(R_2)\text{=}CH_2 \qquad \text{IV;}$$

$$(R_6)OC(O)C(R_6)\text{=}CH_2 \qquad \text{V;}$$

or $$CH_2\text{=}CCl_2 \qquad \text{VI}$$

wherein each $R_2$ is independently H or an alkyl radical of 1 to about 4 carbon atoms is disclosed, and each $R_6$ is independently H or an alkyl of 1 to about 8 carbon atoms.

4 Claims, No Drawings

POLYMERIC COMPOSITIONS FOR SOIL RELEASE ON FABRICS

This application claims benefit of Provisional Appln. No. 60/089,871 filed Jun. 19, 1998.

FIELD OF THE INVENTION

This invention relates to fluorochemical copolymers and their application to fabrics and fabric blends to impart soil release properties.

BACKGROUND OF THE INVENTION

Fabric soiling, always a problem with textiles, became even more of a problem with the advent of permanent press fabrics composed of cotton-synthetic blends. These are treated with various additives, which often make them more difficult to clean. In addition, permanent press fabrics are best laundered at low temperatures and mild agitation, whereas soil is best removed at higher temperatures and vigorous agitation. For these reasons, various soil release agents are frequently applied to such fabrics to aid in removing soil during laundering. Preferably, these soil release agents are not themselves removed during laundering (i.e., are durable), and either improve or do not harm other desired properties of the fabric.

Fluorochemicals, despite their comparatively high cost, are probably the most widely used soil release agents on cellulosic fabrics because of their performance at low concentration, their compatibility with permanent press finishes, and freedom from most undesired side effects. However, these agents also tend to affect the hydrophilicity and oleophobicity (i.e., the water and oil repellency) of the fabrics in ways that may be desirable for some applications but undesirable for others. For example, hydrophilic soil releasers are useful to maintain the desired wicking of moisture from skin that fabrics provide, but such hydrophilicity may not be desirable for some other applications such as outerwear. Balancing these characteristics to achieve the desired properties for certain applications while maintaining good soil release properties is often difficult.

A widely used class of soil release fluorochemicals is composed of perfluorinated urethanes containing polyethylene oxide moieties. Such urethanes and their intermediate isocyanates are costly and potentially hazardous to manufacture. The urethane type products are often repellent as well as soil releasing, and thus reduce the comfort of wearing cotton or similar garments. These existing products are difficult to modify when it is desired to increase the degree of hydrophilicity of the fabric for a particular application.

Fluorochemicals which are not urethane based have been used for oil and water repellency in the paper industry. U.S. Pat. No. 5,674,961 of Fitzgerald discloses a class of fluorochemical copolymers useful for improving the water, oil and grease resistance of paper. None of the information in this patent suggests that such a copolymer might be useful as a soil release agent, an entirely different type of application than grease-proofing paper. U.S. Pat. No. 4,147,851 of Raynolds teaches fluorochemical copolymers useful for oil and water repellency applications for paper and fabrics. Again, there is no suggestion that these copolymers are useful as a soil release agent.

Soil release fluorochemicals which are as effective as the perfluorinated urethanes, but which do not involve costly and potentially hazardous isocyanate/urethane chemical manufacturing processes are highly desirable and would have widespread applications. Even more desirably, such a soil release agent would be made by a process, which makes it easier to modify the degree of hydrophilicity of the agent and treated fabric over a wide range to suit various applications. The present invention provides such soil release fluorochemicals.

SUMMARY OF THE INVENTION

The present invention comprises a copolymer composition, which imparts soil release properties to fabrics and fabric blends comprising monomers copolymerized in the following percentages by weight:

(a) from about 30% to about 49% of at least one monomer of formula I:

$$R_f\text{—Q—A—C(O)—C(R)=CH}_2 \qquad \text{I}$$

wherein $R_f$ is a straight or branched-chain perfluoroalkyl group of from 2 to about 20 carbon atoms, R is H or $CH_3$, A is O, S or N(R'), wherein R' is H or an alkyl of from 1 to about 4 carbon atoms, Q is alkylene of 1 to about 15 carbon atoms, hydroxyalkylene of 3 to about 15 carbon atoms, —$(C_nH_{2n})$ $(OC_qH_{2q})_m$—, —$SO_2$—$NR'(C_nH_{2n})$—, or —$CONR'(C_nH_{2n})$—, wherein R' is H or an alkyl of from 1 to about 4 carbon atoms, n is 1 to about 15, q is 2 to about 4, and m is 1 to about 15;

(b) from about 10% to about 70% of at least one monomer or a mixture of monomers selected from formula IIA, formula IIB, and formula IIC:

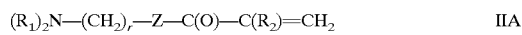
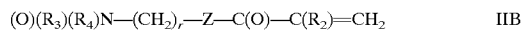
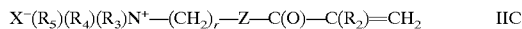

$$(R_1)_2N\text{—}(CH_2)_r\text{—Z—C(O)—C(R_2)=CH}_2 \qquad \text{IIA}$$

$$(O)(R_3)(R_4)N\text{—}(CH_2)_r\text{—Z—C(O)—C(R_2)=CH}_2 \qquad \text{IIB}$$

$$X^-(R_5)(R_4)(R_3)N^+\text{—}(CH_2)_r\text{—Z—C(O)—C(R_2)=CH}_2 \qquad \text{IIC}$$

wherein

Z is —O— or —$NR_5$—; $R_1$ is an alkyl group of from 1 to about 3 carbon atoms; $R_2$ is H or an alkyl radical of 1 to about 4 carbon atoms; $R_3$ and $R_4$ are each an alkyl of 1 to 4 carbon atoms, hydroxyethyl, benzyl, or $R_3$ and $R_4$ together with the nitrogen atom form a morpholine, pyrrolidine, or piperadine ring; $R_5$ is H or an alkyl of 1 to 4 carbon atoms, or $R_3$, $R_4$ and $R_5$ together with the nitrogen atom form a pyridine ring; r is 2 to 4; and wherein for formula IIA the nitrogen is from about 40% to 100% salinized; and, (c) from 0% to about 7% of a monomer of the formula III, IV, V, or VI or a mixture thereof:

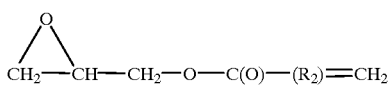

III

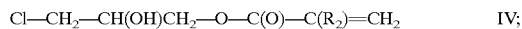

$$Cl\text{—}CH_2\text{—CH(OH)CH}_2\text{—O—C(O)—C(R_2)=CH}_2 \qquad \text{IV;}$$

$$(R_6)OC(O)C(R_6)=CH_2 \qquad \text{V;}$$

or

$$CH_2=CCl_2 \qquad \text{VI}$$

wherein each $R_2$ is independently H or an alkyl radical of 1 to about 4 carbon atoms and each $R_6$ is independently H or an alkyl of 1 to about 8 carbon atoms.

The present invention further comprises a method of treating fabrics and fabric blends to impart soil release properties comprising application to the surface of the fabric or blended fabric of an effective amount of the copolymer composition comprising monomers copolymerized in the following percentages by weight:

(a) from about 30% to about 90% of at least one monomer of formula I:

$$R_f-Q-A-C(O)-C(R)=CH_2 \qquad \text{I}$$

wherein $R_f$ is a straight or branched-chain perfluoroalkyl group of from 2 to about 20 carbon atoms, R is H or $CH_3$, A is O, S or N(R'), wherein R' is H or an alkyl of from 1 to about 4 carbon atoms, Q is alkylene of 1 to about 15 carbon atoms, hydroxyalkylene of 3 to about 15 carbon atoms, $-(C_nH_{2n})(OC_qH_{2q})_m-$, $-SO_2-NR'(C_nH_{2n})-$, or $-CONR'(C_nH_{2n})-$, wherein R' is H or an alkyl of from 1 to about 4 carbon atoms, n is 1 to about 15, q is 2 to about 4, and m is 1 to about 15;

(b) from about 10% to about 70% of at least one monomer or a mixture of monomers selected from formula IIA, formula IIB, and formula IIC:

$$(R_1)_2N-(CH_2)_r-Z-C(O)-C(R_2)=CH_2 \qquad \text{IIA}$$

$$(O)(R_3)(R_4)N-(CH_2)_r-Z-C(O)-C(R_2)=CH_2 \qquad \text{IIB}$$

$$X^-(R_5)(R_4)(R_3)N^+-(CH_2)_r-Z-C(O)-C(R_2)=CH_2 \qquad \text{IIC}$$

wherein

Z is $-O-$ or $-NR_5-$; $R_1$ is an alkyl group of from 1 to about 3 carbon atoms; $R_2$ is H or an alkyl radical of 1 to about 4 carbon atoms; $R_3$ and $R_4$ are each an alkyl of 1 to 4 carbon atoms, hydroxyethyl, benzyl, or $R_3$ and $R_4$ together with the nitrogen atom form a morpholine, pyrrolidine, or piperadine ring; $R_5$ is H or an alkyl of 1 to 4 carbon atoms, or $R_3$, $R_4$ and $R_5$ together with the nitrogen atom form a pyridine ring; r is 2 to 4; and wherein for formula IIA the nitrogen is from about 40% to 100% salinized; and, (c) from 0% to about 7% of a monomer of the formula III or IV, or a mixture thereof:

$$\underset{\text{III}}{CH_2-\overset{O}{\overset{|}{CH}}-CH_2-O-C(O)-(R_2)=CH_2}$$

$$Cl-CH_2-CH(OH)CH_2-O-C(O)-C(R_2)=CH_2 \qquad \text{IV;}$$

$$(R_6)OC(O)C(R_6)=CH_2 \qquad \text{V;}$$

or $$CH_2=CCl_2 \qquad \text{VI}$$

wherein each $R_2$ is independently H or an alkyl radical of 1 to about 4 carbon atoms, and each $R_6$ is independently H or an alkyl of 1 to about 8 carbon atoms.

The present invention further comprises a fabric or fabric blend which has been treated according to the method of the present invention as described above. The treated fabric or fabric blend has a fluorine content of from about 0.05% to about 0.5% by weight.

DETAILED DESCRIPTION OF THE INVENTION

This invention comprises improved fluorochemical copolymers useful for imparting soil release properties to fabrics or blends. By "fabrics" is meant natural or synthetic fabrics composed of fibers of cotton, rayon, silk, wool, polyester, polypropylene, polyolefins, nylon, and aramids such as "NOMEX" and "KEVLAR." By "fabric blends" is meant fabric made of two or more types of fibers. Typically these blends are a combination of a natural fiber and a synthetic fiber, but also can include a blend of two natural fibers or of two synthetic fibers. Trademarks and tradenames are indicated herein by capitalization. Superior soil release properties, along with desirable properties of repellency and wicking can be imparted to fabrics and fabric blends by the addition of certain fluorochemical copolymers. These can be applied to the fabric in the form of a self-dispersed emulsion or dispersion in water or other solvent either before, after or during the application of other fabric treatment chemicals.

The highly efficient copolymers useful for this purpose are characterized in that they contain copolymerized comonomers in the following percentages by weight, relative to the total weight of the copolymers:

(a) from about 30% to about 90% of at least one monomer of formula I:

$$R_f-Q-A-C(O)-C(R)=CH_2 \qquad \text{I}$$

wherein $R_f$ is a straight or branched-chain perfluoroalkyl group of from 2 to about 20 carbon atoms, R is H or $CH_3$, A is O, S or N(R'), wherein R' is H or an alkyl of from 1 to about 4 carbon atoms, Q is alkylene of 1 to about 15 carbon atoms, hydroxyalkylene of 3 to about 15 carbon atoms, $-(C_nH_{2n})(OC_qH_{2q})_m-$, $-SO_2-NR'(C_nH_{2n})-$, or $-CONR'(C_nH_{2n})-$, wherein R' is H or an alkyl of from 1 to about 4 carbon atoms, n is 1 to about 15, q is 2 to about 4, and m is 1 to about 15;

(b) from about 10% to about 70% of at least one monomer or a mixture of monomers selected from formula IIA, formula IIB, and formula IIC:

$$(R_1)_2N-(CH_2)_r-Z-C(O)-C(R_2)=CH_2 \qquad \text{IIA}$$

$$(O)(R_3)(R_4)N-(CH_2)_r-Z-C(O)-C(R_2)=CH_2 \qquad \text{IIB}$$

$$X^-(R_5)(R_4)(R_3)N^+-(CH_2)_r-Z-C(O)-C(R_2)=CH_2 \qquad \text{IIC}$$

wherein

Z is $-O-$ or $-NR_5-$; $R_1$ is an alkyl group of from 1 to about 3 carbon atoms; $R_2$ is H or an alkyl radical of 1 to about 4 carbon atoms; $R_3$ and $R_4$ are each an alkyl of 1 to 4 carbon atoms, hydroxyethyl, benzyl, or $R_3$ and $R_4$ together with the nitrogen atom form a morpholine, pyrrolidine, or piperadine ring; $R_5$ is H or an alkyl of 1 to 4 carbon atoms, or $R_3$, $R_4$ and $R_5$ together with the nitrogen atom form a pyridine ring; r is 2 to 4; and wherein for formula IIA the nitrogen is from about 40% to 100% salinized; and, (c) from 0% to about 7% of a monomer of the formula III, IV, V, or VI, or a mixture thereof:

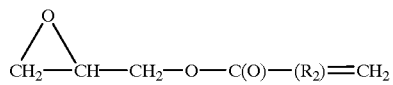

III

Cl—CH$_2$—CH(OH)CH$_2$—O—C(O)—C(R$_2$)=CH$_2$    IV;

(R$_6$)OC(O)C(R$_6$)=CH$_2$    V;

or

CH$_2$=CCl$_2$    VI wherein
each R$_2$ is independently H or an alkyl radical of 1 to about 4 carbon atoms, and each R$_6$ is independently H or an alkyl of 1 to about 8 carbon atoms.

Preferably the monomer of formula I is a perfluoroalkylethyl acrylate. More preferably the perfluoroalkyl carbon chain length distribution by weight is about 50% of 8-carbon, about 29% of 10-carbon, about 11% of 12-carbon, and with smaller percentages of 6-carbon, 14-carbon and longer chain lengths.

The proportion of monomer (a) of formula I is at least about 30% relative to the total weight of copolymer. If it is present in lower amounts, the polymer becomes more hydrophilic and the oil repellency drops off to an undesirable level. In the method and treated fabric or fabric blend of the present invention the proportion of monomer (a) of formula I is less than about 90%. If it is present in higher amounts, the amounts of the solubilizing monomer (b) of formula IIA and/or IIB will be too low, resulting in poor dispersability. In the copolymer composition of the present invention the proportion of monomer (a) of formula I in the copolymer is between about 30% and about 49% by weight. This latter range is preferred for the best balance of soil release, hydrophilicity and oleophobicity in currently envisioned applications of treatment of fabrics and fabric blends. More preferably the proportion of monomer (a) of formula I in the copolymer is between about 30% and about 45% by weight. Other proportions may be more desirable for other applications.

In fact, one of the major advantages of the inventive composition is that its hydrophilic and oleophobic properties can be varied over a wide range for different applications by simply varying the relative amounts of monomers (a) of formula I and (b) of formula IIA and/or IIB, while still maintaining its properties as an effective soil release agent. That is, the copolymer is modified to make the treated fabric more oleophobic and water repellent by increasing the proportion of monomer (a) of formula I within the above range, or is modified to make the treated fabric more hydrophilic (thereby improving wicking) by increasing the proportion of monomer (b) of formula IIA and/or IIB. This flexibility has not been found possible with existing, more expensive soil release agents.

Preferably monomer (b) of formula IIA is derived from diethylaminoethyl methacrylate by partial or full salinization. The free amine portions of the resulting copolymer is then reacted with a salinizing agent such as acetic acid, resulting in the conversion of part or all of the amine moieties to the corresponding acetate. It must be at least about 40% salinized for adequate solubilizing effect, but may be as high as 100%. Preferably the degree of salinization is between about 50% and about 100%. Alternatively, the salinization reaction is carried out on the amine group before the polymerization reaction with equally good results. The salinizing group is an acetate, halide, sulfate, tartarate or other known salinizing group.

The proportion of monomer (b) of formula IIA, IIB, IIC or a mixture thereof must be at least about 10% for adequate solubilization. While a copolymer with proportions of this monomer (b) above about 70% may be satisfactory in soil releasing properties, such a proportion will produce polymers with very high viscosity, making processing and handling difficult. Preferably the proportion of monomer (b) of formula IIA, IIB, IIC or a mixture thereof in the copolymer is between about 50% and about 65% by weight for the best balance of soil release, hydrophilicity, oleophobicity and viscosity in currently envisioned applications. Other proportions may be more desirable for other applications. All weight percentages are based on the monomer weight as quaternized.

The amine oxide monomers of formula IIB have the formula (O)(R$_3$)(R$_4$)N—(CH$_2$)$_r$—Z—C(O)—C(R$_2$)=CH$_2$ as described hereinabove wherein NR$_3$R$_4$(O) represents

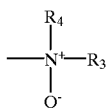

They are prepared by reacting the aforesaid acrylate or methacrylate ester or corresponding acrylamide or methacrylamide with conventional oxydizing agents such as hydrogen peroxide or peracetic acid.

The quaternary ammonium monomers of formula IIC are prepared by reacting the acrylate or methacrylate esters or corresponding acrylamide or methacrylamide with a di-(lower alkyl) sulfate, a lower alkyl halide, trimethylphosphate or triethylphosophate. Dimethyl sulfate and diethyl sulfate are preferred quaternizing agents.

The presence of monomer (c) of formula III, IV, V, or VI is optional, depending on the particular application for the copolymer. While there are some applications for which it is not necessary, for most of the presently envisioned applications it is present to achieve satisfactory bonding to the fibers. While not wishing to be bound by this theory, it is believed that monomer (c) of formula III and IV acts as a reactive site for the polymer to covalently bond to the substrate surface. Monomers V and VI can be incorporated to improve the compatability of the copolymer with the fabric substrate. To have a noticeable effect on this property, it must be present in a proportion of at least about 1%. An amount above about 7% is unnecessary and may not further improve this performance. Preferably, for many applications, the proportion of monomer (c) of formula III, IV, V or VI in the copolymer is from about 1% to about 5% by weight. Preferably (c) is glycidyl methacrylate. The monomers of formula III, IV, V and VI are prepared by conventional methods known in the art.

The polymerization of comonomers (a), (b) and (c) is carried out in a solvent such as acetone, methylisobutyl ketone, ethyl acetate, isopropanol, and other ketones, esters and alcohols. The polymerization is conveniently initiated by azo initiators such as 2,2'-azobis(2,4-dimethylvaleronitrile). These initiators are sold by E. I. du Pont de Nemours and Company, Wilmington, Del., commercially under the name of "VAZO" 67, 52 and 64, and by Wako Pure Industries, Ltd., Richmond, Va., under the name "V-501."

The present invention further comprises a method of treating fabrics or fabric blends comprising application to the surface of the fabric or fabric blend of an effective amount of a copolymer as described above. The copolymers are applied to the fabric or blended fabric to be treated from aqueous dispersions, either alone or in a mixture with other textile treatment agents or finishes. The dispersions are generally applied to textile fabrics by spraying, dipping, padding, or other well-known methods. After excess liquid has been removed, for example by squeeze rolls, the treated fabric is dried and then cured by heating, for example, to 100° C. to 190° C., for at least 30 seconds, typically 60–180 seconds. Such curing enhances soil release and durability of the soil release. While these curing conditions are typical, some commercial apparatus may operate outside these ranges because of its specific design features.

The present invention further comprises a fabric or fabric blend which has been treated to impart soil release properties thereto by application of an effective amount of a copolymer as described above. The treated fabric has a fluorine content of from about 0.05% to about 0.5% by weight. The treated fabric has superior soil release properties along with desirable properties of repellency and wicking.

The copolymers and method of the present invention are useful to enhance soil release from fabrics and fabric blends during laundering. The soil release property is durable, and is especially effective for permanent press fabric blends. The treated fabrics and fabric blends of the present invention are useful in a variety of applications such as for textiles, clothing, furnishings and the like. The copolymers of the present invention are advantageous in that they are safer to manufacture than the isocyanate type copolymer, and that it is easy to adjust the degree of hydrophilicity of the copolymer and treated fabric or fabric blend over a wide range by modifying the level of monomers of formulae I versus IIA and IIB allowing for a variety of end use applications. The inventive compositions are made at lower materials cost than isocyanate-based soil release agents, in part because the gas/liquid reactions required for manufacturing phosgene and isocyanates are eliminated.

TEST METHODS

The following tests were employed in evaluating the examples herein.

Soil Release

The copolymer materials were tested as a soil release agent as described in AATCC 130-1981, designed to measure the ability of a fabric to release oily stains during a typical home laundering. In this method, an oily stain on a test specimen is produced by using a weight to force a given amount of stain into the fabric. The soiled fabric is laundered, and the residual stain is compared to a scale from 1 to 5 using a standard soil release replica. The number 5 represents the most effective soil release properties and the number 1 the least. Intermediate values are assigned between 1 and 5.

Specifically, the tests are carried out as follows. Five drops of a specific oily soiling agent are placed in the approximate center of a test specimen of fabric. Then a square of glassine paper is placed over the fabric, covering the puddle, followed by a 5 lb (2.3 Kg) weight over the glassine paper. This is allowed to sit for 60 seconds, then the weight and glassine paper are removed. The test specimen is then washed within 15 to 60 minutes at a temperature of 41° C. using 140 grams of detergent "Tide" available from Procter and Gamble Company, Cincinnati, Ohio, in a standard washer, along with test specimen ballast to make a total weight of 1.8 Kg, for a period of 12 minutes. The entire washer load of specimen and ballast is then placed in a dryer and dried at a maximum air outlet temperature of 70° C. for 45 minutes. The dried test samples are then judged in comparison to the standard scale as described above.

Water Repellency

The water repellency of a treated substrate was measured according to the DuPont technical Laboratory Method as outlined in the Teflon® Global Specifications and Quality Control Tests information packet. The test determines the resistance of a treated substrate to wetting by aqueous liquids. Drops of water-alcohol mixtures of varying surface tensions are placed on the fabric and the extent of surface wetting is determined visually. The test provides a rough index of aqueous stain resistance. The higher the water repellency rating, the better the resistance of a finished substrate to staining by water-based substances. The composition of standard test liquids is shown in the following table.

TABLE 1

| Water Repellency Rating Number | Standard Test Liquids Composition, Vol % | |
|---|---|---|
| | Isopropyl Alcohol | Distilled Water |
| 1 | 2 | 98 |
| 2 | 5 | 95 |
| 3 | 10 | 90 |
| 4 | 20 | 80 |
| 5 | 30 | 70 |
| 6 | 40 | 60 |
| 7 | 50 | 50 |
| 8 | 60 | 40 |

Oil Repellency

The treated fabric samples were tested for oil repellency by a modification of AATCC standard Test Method No. 118, conducted as follows. A fabric sample, treated with an aqueous dispersion of polymer as previously described, is conditioned for a minimum of 2 hours at 23° C.+20% relative humidity and 65° C.+10% relative humidity. A series of organic liquids, identified below in Table I, are then applied dropwise to the fabric samples. Beginning with the lowest numbered test liquid (Repellency Rating No. 1), one drop (approximately 5 mm in diameter or 0.05 mL volume) is placed on each of three locations at least 5 mm apart. The drops are observed for 30 seconds. If, at the end of this period, two of the three drops are still spherical in shape with no wicking around the drops, three drops of the next highest numbered liquid are placed on adjacent sites and similarly observed for 30 seconds. The procedure is continued until one of the test liquids results in two of the three drops failing to remain spherical to hemispherical, or wetting or wicking occurs.

The oil repellency rating of the fabric is the highest numbered test liquid for which two of the three drops remained spherical to hemispherical, with no wicking for 30 seconds. In general, treated fabrics with a rating of 5 or more are considered good to excellent; fabrics having a rating of one or greater can be used in certain applications.

TABLE 1A

Oil Repellency Test Liquids

| Oil Repellency Rating Number | Test Solution |
|---|---|
| 1 | NUJOL Purified Mineral Oil |
| 2 | 65/35 Nujol/n-hexadecane by volume at 21° C. |
| 3 | n-hexadecane |
| 5 | n-dodecane |
| 6 | n-decane |

Note: NUJOL is a trademark of Plough, Inc., for a mineral oil having a Saybolt viscosity of 360/390 at 38° C. and a specific gravity of 0.880/0.900 at 15° C.

The following preparative examples were used in evaluating the properties of fabric and fabric blends treated with the inventive copolymers and comparative copolymers.

EXAMPLE 1

A vessel fitted with a stirrer, thermometer, and reflux condenser was charged with 673.5 parts by weight of fluoromonomer (a) having the formula:

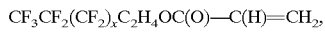

$$CF_3CF_2(CF_2)_xC_2H_4OC(O)\text{—}C(H)\text{=}CH_2,$$

wherein x=6, 8, 10, 12, 14, 16, and 18 in the respective relative amounts of about 3%, 50%, 31%, 10%, 3% 2% and 1%, said monomer having a weight average molecular weight of 569; 119.5 parts by weight of monomer (b), N,N-diethylaminoethyl methacrylate; 19.0 parts by weight of monomer (c), glycidyl methacrylate; and 505 parts by weight of methyl isobutyl ketone (MIBK). The charge was purged with nitrogen at 40° C. for 30 minutes. "VAZO" 67 (0.6 parts by weight), or 2,2-azobis (2,4-dimethylvaleronitrile) available from E. I. du Pont de Nemours and Company, Wilmington, Del., was then added to initiate polymerization and the charge was stirred for 16 hours at 70° C. under nitrogen.

A mixture of water (2435 parts) and acetic acid (59.5 parts) at room temperature was added to the above copolymer mixture at 70° C. The reflux condenser was replaced with a distillation column and the MIBK was removed at reduced pressure. A total of 3103 parts of copolymer solution was obtained. The copolymer solids (23.1%) contained 82.2% perfluoroalkylethyl acrylate units, 15.4% N,N-diethylaminoethyl methacrylate units and 2.4% glycidyl methacrylate units.

EXAMPLE 2

The process of Example 1 was repeated using the same monomers and other ingredients, but in the following proportions: Monomer (a), 40.0 g; monomer (b), 57.6 g; monomer (c), 2.4 gm; "VAZO" 67, 1.6 g; MIBK, 136 g, water 387.6 g, acetic acid, 28.9 g.

After the MIBK was removed, the copolymer solids contained 40.0% perfluoroalkylethyl acrylate units, 57.6% N,N-diethylaminoethyl methacrylate units and 2.4% glycidyl methacrylate units.

Comparative Example A

This is an example of a fluorourethane with polyethylene oxide units, "ZONYL" 7910 commercially used for soil release purposes. ("ZONYL" 7910 is available from E. I. du Pont de Nemours and Company, Wilmington, Del.)

The fabric used in the following tests was a 50%/50% polyester/cotton fabric treated with the previously described fluorochemicals of Examples 1, 2 and Comparative Example A. The oily materials used in the following tests were Kaydol 4 (a standard mineral oil), corn oil, and motor oil as soils. The wickability (hydrophilicity) represents the time in seconds for a water drop to be completely absorbed into the fabric surface. Results are shown in Table 2 below.

TABLE 2

Tests of Fluorochemicals on Polyester/Cotton

| | Soil Release Properties | | | Repellency | |
|---|---|---|---|---|---|
| | Mineral Oil | Corn Oil | Motor Oil | Wickability | Oil Repellency |
| Initial Performance (1 Home Wash) | | | | | |
| Example 1 | 4 | 4 | 1 | None | 5 |
| Example 2 | 4 | 4 | 2 | 45 seconds | 0 |
| Comparative Example A | 4 | 4 | 2 | None | 1 |
| After 5 Home Washes | | | | | |
| Example 1 | 4 | 4 | 1 | | |
| Example 2 | 5 | 4 | 2 | | |
| Comparative Example A | — | 5 | 2 | | |

In the above tests, the composition of Example 2 tested better than that of Example 1, and nearly equivalent to the more expensive Comparative Example A. In the wickability test, Example 2 showed complete absorption in 45 seconds, whereas for Example 1 and Comparative Example A the water drop never penetrated the fabric. The comparison of Examples 1 and 2 shows the difference in wickability obtainable by varying the ratio of monomers (a) and (b).

In the following tests, the fluorocarbon polymer was applied to a 100% cotton fabric for pants by a size press. Both baths contained a resin (Permafresh MSC available from Sequa Chemicals, Inc., Chester, S.C.) at 16 grams/liter. The fabric samples were dried at 166° C. for 2 minutes. After washing, the fabrics were tumble dried and evaluated for oil and water repellency and soil release (using Kaydol 4 mineral oil). The number of home washings is listed in the table as HW.

TABLE 3

Comparative Tests of Fluorochemicals on Cotton

| | Oil Repellency | | Water Repellency | | Spray Rating | | Soil Release | |
|---|---|---|---|---|---|---|---|---|
| | 1 HW | 10 HW | 1 HW | 10 HW | 1 HW | 10 HW | 1 HW | 10 HW |
| Example 1 | 6 | 2 | 8 | 2 | 70 | 50 | 5 | 4 |
| Comparative Example A | 4 | 0 | 5 | 0 | 50 | 0 | 5 | 4 |

The above results clearly showed the advantage in oil and water repellency for Example 1 versus the more expensive ethoxylated isocyanate composition (Comparative Example A).

EXAMPLE 3

A vessel was charged with 75.0 parts by weight of fluoromonomer (a) having the formula $CF_3CF_2(CF_2)_xC_2H_4OC(O)-C(H)=CH_2$, wherein x=6, 8, 10, 12, 14, 16, and 18 in the respective relative amounts of about 3%, 50%, 31%, 10%, 3% 2% and 1%, said monomer having a weight average molecular weight of 569; 25.0 parts by weight of N,N-diethylaminoethyl methacrylate; 2.5 parts by weight of glycidyl methacrylate and 100.0 parts by weight of isopropyl alcohol. The charge was purged with nitrogen for 30 minutes at 45° C. "VAZO" 67 (1.4 parts) as in Example 1 was then added to initiate polymerization and the charge was stirred at 65° C. for 16 hours. Paracetic acid (32.0 parts, 32% in acetic acid available from Aldrich Chemical Co., Milwaukee, Wis.) was added over a period of about 1 hour while the temperature was maintained at about 70° C. The mixture held at 70° C. for a further hour after the addition of the peracetic acid was complete.

EXAMPLE 4

A mixture of 70 parts by weight fluoromonomer $CF_3CF_2(CF_2)_sC_2H_4O_2CC(CH_3)=CH_2$, wherein s=2, 4, 6, 8, 10 and 12, and 30 parts by weight N,N-diethylaminoethyl methacrylate (DEAM) monomer was polymerized at 80° C. to 83° C., in 43 parts by weight methyl isobutyl ketone as solvent, using 0.5 parts by weight azobis(isobutyronitrile) as initiator.

The DEAM units were functionalized after polymerization by conversion to either the amine acetate or amine oxide salt or a mixture thereof. DEAM functionalization was effected by heating (50° C. to 60° C.) the copolymer dispersion with at least equivalent amounts of acetic acid, sulfuric acid, 30% hydrogen peroxide, 40% peracetic acid or mixtures thereof in aqueous-methylisobutyl ketone solvent. The solvent was distilled under reduced pressure. The nonvolatile solids content of the resulting copolymer solution was determined by drying a 0.4 to 0.6 part sample for 2 hours at 110° C. in a vacuum oven at 20–22 in of Hg. The copolymer solids was 23.6%.

The following samples were then applied to a white 65% polyester/35% cotton blend and to 100% cotton at equal fluorine loadings on the fabrics. All baths contained a permanent press resin Permafresh 113B available from Segua Chemicals Inc., Chester, S.C., and catalyst at about 30 g/L and acetic acid at 1 g/L. Fabric was dried and cured by heating to 380° F. (193° C.) for 3 minutes. Oil repellency, water repellency, and soil release (Kaydol mineral oil) were determined as previously described. No wickability performance was evaluated in this experiment.

TABLE 4

| Sample | Oil Repellency | Water Repellency | Soil Release |
|---|---|---|---|
| 65% Polyester/35% Cotton Fabric | | | |
| Example 1 | 6 | 8 | 4 |
| Example 3 | 3 | 6 | 2 |
| Example 4 | 2 | 7 | 3 |
| Comparative Example A | 5 | 5 | 4 |
| 100% Cotton Fabric | | | |
| Example 1 | 5 | 8 | 4 |
| Example 3 | 3 | 5 | 2 |
| Example 4 | 2 | 6 | 3 |
| Comparative Example A | 2 | 4 | 4 |

EXAMPLE 5–6

The process of Example 1 was repeated using the following components. Monomer (a) in these examples had the formula $CF_3CF_2(CF_2)_xC_2H_4OC(O)-C(CH_3)=CH_2$, wherein x=2, 4, 6, 8, 10, and 12, in the respective relative amounts of about 3%, 35%, 30%, 17%, 8% and 6%, said monomer having a weight average molecular weight of 543 available from E. I. du Pont de Nemours and Co., Wilmington, Del., as "ZONYL" ™; monomer (b) for Example 5 was N,N-dimethylaminoethyl methacrylate methyl chloride salt (70% aqueous solution), and monomer (b) for Example 6 was N,N-dimethylaminoethyl methacrylate methyl sulfate salt. Both monomers are available from Monomer-polymer & Dajac Laboratories, Inc. of Trevose Penn. In examples 5 and 6 component (a) was present at 70% by weight and component (b) was present at 30% by weight. "VAZO" 67, (0.5 g) as described in Example 1, was used as the polymerization initiator and the solvent used in both cases was isopropyl alcohol (60 g). After heating at 60° C. for 3 hours, water (470 g) was added and the polymeric material was dispersed with stirring. The isopropanol was not removed in these examples.

The Examples 5 and 6 were applied to a 100% cotton twill fabric and to a 65%/35% polyester cotton fabric as previously described at 35 g/L and 31 g/L respectively with 80 g/L of permanent press resin Permafresh MSC available from Segua Chemicals Inc., Chester, S.C. The fabrics were cured at 330° F. (166° C.) for two minutes and the fabrics were rated for soil release and oil and water repellency initially and after laundering as previously described. The results are displayed in Table 5. HW indicates the number of home washings

TABLE 5

Comparative Tests on Cotton and Polyester Cotton

| | 100% Cotton | | | | | 65%/35% Polyester/Cotton | | | | |
|---|---|---|---|---|---|---|---|---|---|---|
| | Oil Repellency | | Water Repellency | | Soil Release | Oil Repellency | | Water Repellency | | Soil Release |
| | Initial | 5 HW | Initial | 5 HW | Initial | Initial | 5 HW | Initial | 5 HW | Initial |
| Example 5 | 0 | 0 | 0 | 0 | 3 | 0 | 0 | 0 | 0 | 2 |
| Example 6 | 0 | 0 | 7 | 2 | 2 | 0 | 0 | 3 | 0 | 2 |
| Example 1 | 6 | | 8 | | 5 | | | | | |

As can be seen from Example 5 and 6 (compared to Example 1 for the 100% cotton fabric), soil release properties were imparted to fabrics without providing a high level repellency (Example 6) or indeed any repellency at all (Example 5).

EXAMPLE 7–13

The process of Example 5 was repeated using the copolymer compositions as described in Table 6. Monomer (a) in these examples had the formula $CF_3CF_2(CF_2)_xC_2H_4OC(O)—C(CH_3)=CH_2$, wherein x=2, 4, 6, 8, 10, and 12, in the respective relative amounts of about 3%, 35%, 30%, 17%, 8% and 6%, said monomer having a weight average molecular weight of 543 available from E. I. du Pont de Nemours and Co., Wilmington, Del., as "ZONYL" ™. In Example 13, 2-(N)-ethylperfluoroctanesulfonamide, available as "FLUORAD" FX-14 from the Minnesota Mining and Manufacturing Co., Minneapolis, Minn., was used. Monomer (b) was N,N-diethylaminoethyl methacrylate (DEAM) and monomer (c) was as described in Table 6. "VAZO" 67, as described in Example 1, was used as the polymerization initiator and the solvent used in both cases was isopropyl alcohol.

TABLE 6

| | Monomer a Zonyl TM (wt %) | Monomer b DEAM* (wt %) | Monomer c | Monomer c (wt %) | Salt |
|---|---|---|---|---|---|
| Example 7 | 70 | 25 | Methacrylic acid | 5 | Acetic acid |
| Example 8 | 70 | 15 | 2-ethylhexyl methacrylate | 15 | Acetic acid |
| Example 9 | 65 | 30 | Vinylidene chloride | 5 | Acetic acid |
| Example 10 | 60 | 30 | Vinylidene chloride | 10 | Acetic acid |
| Example 11 | 55 | 30 | Vinylidene chloride | 15 | Acetic acid |
| Example 12 | 70 | 30 | — | — | Tartaric acid |
| Example 13 | FX-14 (74.4 g) | 25.6 | — | — | Acetic acid |

*N,N - diethylaminoethyl methacrylate

After polymerization as described in Example 5, water (470 g) and acetic acid (1 molar equivalent to monomer b) was added and the polymeric material was dispersed with stirring. In the cases of Examples 7–11, various types and amounts of monomer (c) are shown. In the case of Example 12, 1 molar equivalent of tartaric acid was used to form the salt of the amine moieties from monomer (b). The isopropanol was also not removed in these examples. The Example 7–13 were applied to the fabrics and tested for oil and water repellency and soil release as described in Examples 5–6. The results are shown in Table 7. HW indicates the number of home washings.

TABLE 7

Comparative Tests on Cotton and Polyester cotton

| | 100% cotton | | | | | 65%/35% Polyester/Cotton | | | | |
|---|---|---|---|---|---|---|---|---|---|---|
| | Oil Repellency | | Water Repellency | | Soil Release | Oil Repellency | | Water Repellency | | Soil Release |
| | Initial | 5 HW | Initial | 5 HW | Initial | Initial | 5 HW | Initial | 5 HW | Initial |
| Example 7 | 2 | 0 | 7 | 0 | 3 | 2 | 0 | 5 | 0 | 2 |
| Example 8 | 0 | 0 | 6 | 2 | 1 | 0 | 0 | 5 | 2 | 2 |
| Example 9 | 1 | 0 | 6 | 2 | 4 | 0 | 0 | 4 | 2 | 2 |
| Example 10 | 1 | 0 | 5 | 2 | 4 | 0 | 0 | 4 | 2 | 2 |
| Example 11 | 1 | 0 | 5 | 2 | 4 | 0 | 0 | 4 | 2 | 2 |
| Example 12 | 2 | 0 | 6 | 2 | 3 | 1 | 0 | 5 | 3 | 1 |
| Example 13 | 2 | 1 | 5 | 3 | 4 | 1 | 0 | 4 | 2 | 1 |

EXAMPLES 14–16

The process of Example 5 was repeated using the copolymer compositions described in Table 8. Monomer (a) in these examples had the formula $CF_3CF_2(CF_2)_xC_2H_4OC(O)—C(CH_3)=CH_2$, wherein x=2, 4, 6, 8, 10, and 12, in the respective relative amounts of about 3%, 35%, 30%, 17%, 8% and 6%, said monomer having a weight average molecular weight of 543 available from E. I. du Pont de Nemours and Co., Wilmington, Del., as "ZONYL" ™; monomer (b) for Examples 14–16 was N,N-diethylaminoethyl methacrylate (DEAM). No monomer (c) was used in these examples. "VAZO" 67, as described in Example 1 was used as the polymerization initiator and the solvent used in Examples 14–16 was isopropyl alcohol.

TABLE 8

| | Monomer a Zonyl TM (wt %) | Monomer b DEAM (wt %) | Peracetic acid | Hydrogen peroxide |
|---|---|---|---|---|
| Example 14 | 70 | 30 | Yes | No |
| Example 15 | 70 | 30 | No | Yes |
| Example 16 | FX-14 (70 g) | 30 | Yes | No |

After polymerization as described in Example 5, peracetic acid or hydrogen peroxide (both available from Aldrich Chemical Co., Milwaukee, Wis.; 1 molar equivalent to monomer b) was cautiously added and heated for 1 hour. Water was then added and the polymeric material was dispersed with stirring. The isopropanol was also not removed in these examples. Examples 14–16 were applied to the fabrics as in Example 5, and tested for oil and water repellency and soil release as previously described. The results are shown in Table 9. HW indicates the number of home washings.

EXAMPLE 17–21

The process of Example 14 was repeated using the copolymer compositions as described in Table 10. Component (a) had the formula $CF_3CF_2(CF_2)_xC_2H_4OC(O)—C(H)=CH_2$ wherein x=4, 6, 8, 10 and 12+ in the respective relative amounts of about 3%, 50% 29%, 11% and 7% said monomer having a weight average molecular weight of 543, available as "ZONYL" TA-N from E. I. DuPont de Nemours and Co., Wilmington, Del.; component (b) for Example 17 was N,N-diisopropylethylaminoethyl methacrylate (DIPAM); Component (c) was glycidyl methacrylate (GMA). For Examples 18–21 component (b) was N,N-diethylaminoethyl methyacrylate (DEAM). For Example 18 component (c) was chlorohydroxypropyl methacrylate (CHPM). For Examples 19–21 component (c) was glycidyl methacrylate (GMA). "VAZO" 67, as described in Example 1 was used as the polymerization initiator and the solvent used in both cases was isopropyl alcohol.

After polymerization as described in Example 5 peracetic acid (available from Aldrich Chemical Co., Milwaukee, Wis.; 1 molar equivalent to component b) was cautiously added and heated for 1 hour. Water was then added and the polymeric material was dispersed with stirring. The isopropanol was also not removed in these examples. Examples 17–21 were applied to fabrics as in Example 5 and tested for oil and water repellency and soil release as previously described. The results are shown in Table 11. HW indicates the number of home washings.

TABLE 9

Comparative Tests on Cotton and Polyester cotton

| | 100% cotton | | | | | | 65%/35% Polyester/Cotton | | | | | |
|---|---|---|---|---|---|---|---|---|---|---|---|---|
| | Oil Repellency | | Water Repellency | | Soil Release | | Oil Repellency | | Water Repellency | | Soil Release | |
| | Initial | 5 HW | Initial | 5 HW | Initial | | Initial | 5 HW | Initial | 5 HW | Initial | |
| Example 14 | 3 | 0 | 5 | 3 | 3 | | 1 | 0 | 4 | 2 | 1 | |
| Example 15 | 3 | 0 | 5 | 3 | 3 | | 2 | 0 | 4 | 2 | 1 | |
| Example 16 | 2 | 0 | 4 | 1 | 1 | | 2 | 0 | 3 | 2 | 1 | |

TABLE 10

| | Monomer a Zonyl TAN (wt) | Monomer b DEAM (wt) | Monomer b (wt) | Monomer c (wt) | Salt |
|---|---|---|---|---|---|
| Example 17 | 82 | — | DIPAM 15.4 | GMA (2.4) | Peracetic acid |
| Example 18 | 82 | 15.4 | — | CHPM (2.4) | Acetic acid |
| Example 19 | 82.1 | 15.4 | — | GMA (2.4) | Peracetic acid |
| Example 20 | 78 | 19.5 | — | GMA (2.5) | Peracetic acid |
| Example 21 | 63 | 34.5 | — | GMA (2.5) | Peracetic acid |

TABLE 10-continued

| | Monomer a Zonyl TAN (wt) | Monomer b DEAM (wt) | Monomer b (wt) | Monomer c (wt) | Salt |
|---|---|---|---|---|---|

GMA = Glycidyl methacrylate.
CHPM = chlorohydroxypropyl methacrylate
DIPAM = N,N-diisopropyl aminoethyl methacrylate

TABLE 11

Comparative Tests on Cotton and Polyester cotton

| | 100% cotton | | | | | | 65%/35% Polyester/Cotton | | | | | |
|---|---|---|---|---|---|---|---|---|---|---|---|---|
| | Oil Repellency | | Water Repellency | | Soil Release | | Oil Repellency | | Water Repellency | | Soil Release | |
| | Initial | 5 HW | Initial | 5 HW | Initial | | Initial | 5 HW | Initial | 5 HW | Initial | |
| Example 17 | 2 | 0 | 3 | 2 | 4 | | 1 | 0 | 3 | 1 | 2 | |
| Example 18 | 5 | 2 | 7 | 3 | 5 | | 4 | 1 | 5 | 3 | 1 | |
| Example 19 | 5 | 2 | 8 | 3 | 4 | | 3 | 0 | 5 | 2 | 2 | |
| Example 20 | 4 | 0 | 5 | 2 | 4 | | 1 | 0 | 3 | 1 | 1 | |
| Example 21 | 2 | 0 | 4 | 3 | 2 | | 0 | 0 | 2 | 0 | 1 | |

For Example 17, an amine-containing monomer (DIPAM) was used showing that the performance as a soil release/repellent is general to this component. Example 18 showed the utility of 2-chlorohydroxypropyl methacrylate and its effect on the durability of the oil and water repellency. Examples 19–21 showed the effects of a range of ratios of Component (a) to Component (b). Example 19 had the highest ratio of Component (a) to Component (b) and also had the most durable oil and water repellency and the highest stain release performance.

EXAMPLE 22

In a Warring blender of the following materials were combined; "ZONYL" ™, as described in Examples 14–16 (70.0 parts); N,N-diethylaminoethyl methacrylate methyl chloride salt (30.0 parts); the cationic surfactant N,N-dimethyloctadecyl amine (10.0 parts); and acetic acid (1.0 parts). The mixture was blended for 30 seconds then microfluidized by 2 passes at 6,000 psi (4.14×10$^7$ Pa). A vessel fitted with a stirrer, thermometer, and reflux condenser was charged with the resulting emulsion and was purged with nitrogen 30 minutes. Azobis isobutyramidine hydrochloride (V-50, 0.5 g) available from Wako Chemical, Richmond, Va., in water (10.0 g), was then added to initiate polymerization and the charge was stirred for 10 hours at 60° C. under nitrogen. The resulting emulsion was applied to 100% cotton twill fabric and cured as described in Example 5. The results are shown in Table 12. HW indicates the number of Home Washings.

TABLE 12

Comparative Tests on Cotton and Polyester cotton

| | 100% cotton | | | | |
|---|---|---|---|---|---|
| | Oil Repellency | | Water Repellency | | Soil Release |
| | Initial | 5 HW | Initial | 5 HW | Initial |
| Example 22 | 0 | 0 | 0 | 0 | 3 |

TABLE 12-continued

Comparative Tests on Cotton and Polyester cotton

| | 100% cotton | | | | |
|---|---|---|---|---|---|
| | Oil Repellency | | Water Repellency | | Soil Release |
| | Initial | 5 HW | Initial | 5 HW | Initial |
| Example 5 | 3 | | 8 | | 2 |

What is claimed is:

1. A copolymer composition comprising monomers copolymerized in the following percentages by weight:

(a) from about 30% to about 49% of at least one monomer of formula I:

wherein $R_f$ is a straight or branched-chain perfluoroalkyl group of from 2 to about 20 carbon atoms R is H or $CH_3$, A is O, S or N(R'), wherein R' is H or an alkyl of from 1 to about 4 carbon atoms, Q is alkylene of 1 to about 15 carbon atoms, hydroxyalkylene of 3 to about 15 carbon atoms, —($C_nH_{2n}$)($OC_qH_{2q}$)$_m$—, —$SO_2$—NR'($C_nH_{2n}$)—, or —CONR'($C_nH_{2n}$)—, wherein R' is H or an alkyl of from 1 to about 4 carbon atoms, n is 1 to about 15, q is 2 to about 4, and m is 1 to about 15;

(b) from about 10% to about 70% of at least one monomer or a mixture of monomers selected from formula IIA, formula IIB, and formula IIC:

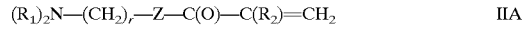

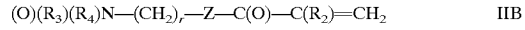

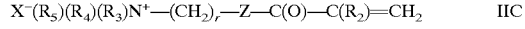

wherein

Z is —O— or —NR$_5$—; R$_1$ is an alkyl group of from 1 to about 3 carbon atoms; R$_2$ is H or an alkyl radical of 1 to about 4 carbon atoms; R$_3$ and R$_4$ are each an alkyl of 1 to 4 carbon atoms, hydroxyethyl, benzyl, or R$_3$ and R$_4$ together with the nitrogen atom form a morpholine, pyrrolidine, or piperadine ring; R$_5$ is H or an alkyl of 1 to 4 carbon atoms, or R$_3$, R$_4$ and R$_5$ together with the nitrogen atom form a pyridine ring; r is 2 to 4; and wherein for formula IIA the nitrogen is from about 40% to 100% salinized; and, (c) from about 1% to about 7% of a monomer of the formula III, IV, V, or VI or a mixture thereof:

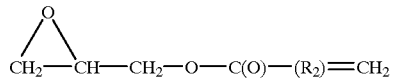
III

Cl—CH$_2$—CH(OH)CH$_2$—O—C(O)—C(R$_2$)=CH$_2$  IV;

(R$_6$)OC(O)C(R$_6$)=CH$_2$  V;

or

CH$_2$=CCl$_2$  VI wherein
each R$_2$ is independently H or an alkyl radical of 1 to about 4 carbon atoms and each R$_6$ is independently H or an alkyl of 1 to about 8 carbon atoms,
said copolymer composition being self-dispersed and imparting soil release properties to fabrics and fabric blends treated therewith.

2. The composition of claim 1 wherein for the monomer of formula I, R$_f$ is a straight chain fluoroalkyl group of 2 to about 20 carbon atoms, A is O, and Q is alkylene of 1 to about 15 carbon atoms.

3. The composition of claim 1 wherein formula I is perfluoroalkylethyl acrylate, formula II is diethylaminoethyl methacrylate, and formula III is glycidyl methacrylate.

4. The composition of claim 3 wherein the monomer of formula I is CF$_3$CF$_2$(CF$_2$)$_x$C$_2$H$_4$OC(O)—C(H)=CH$_2$ wherein x is an even integer from 6 to 18 or mixtures thereof.

* * * * *